US012474293B2

(12) United States Patent
Isoda et al.

(10) Patent No.: US 12,474,293 B2
(45) Date of Patent: Nov. 18, 2025

(54) SENSOR ELEMENT AND GAS SENSOR

(71) Applicant: NGK INSULATORS, LTD., Aichi (JP)

(72) Inventors: Michiaki Isoda, Nagoya (JP); Kei Kosaka, Nagoya (JP); Yosuke Noritake, Vernon Hills, IL (US); Keita Kayano, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 345 days.

(21) Appl. No.: 17/971,667

(22) Filed: Oct. 24, 2022

(65) Prior Publication Data

US 2023/0053141 A1 Feb. 16, 2023

Related U.S. Application Data

(63) Continuation of application No. PCT/JP2022/008590, filed on Mar. 1, 2022.

(30) Foreign Application Priority Data

Mar. 30, 2021 (JP) ................. 2021-057627

(51) Int. Cl.
*G01N 27/407* (2006.01)
(52) U.S. Cl.
CPC ................ *G01N 27/4077* (2013.01)
(58) Field of Classification Search
CPC .................................................. G01N 27/4077
See application file for complete search history.

(56) References Cited

U.S. PATENT DOCUMENTS

| 2003/0159928 | A1 | 8/2003 | Kojima et al. |
| 2019/0285571 | A1 | 9/2019 | Okamoto et al. |
| 2020/0049679 | A1* | 2/2020 | Nakayama ............. G01N 27/41 |
| 2020/0064301 | A1 | 2/2020 | Nakayama et al. |

(Continued)

FOREIGN PATENT DOCUMENTS

| JP | 2007-132954 A | 5/2007 |
| JP | 2016-65853 A | 4/2016 |
| JP | 2019-158554 A | 9/2019 |

(Continued)

OTHER PUBLICATIONS

Stephen Poulston, et al. , "Characterization of protective coatings for planar automotive gas sensors", Science and Actuators B: Chemical 2005, vol. 110, pp. 209-217, ISSN 0925-4005.

(Continued)

*Primary Examiner* — Luan V Van
*Assistant Examiner* — Randall Lee Gamble, Jr.
(74) *Attorney, Agent, or Firm* — MATTINGLY & MALUR, PC

(57) ABSTRACT

A sensor element includes an element body, an upper connector electrode disposed on a first surface of the element body, and a protective layer that covers at least a front end-side part of the first surface. The protective layer includes a first specific protective layer having a thickness T1 of 10 μm or less. The ratio T1/T2 of the thickness T1 to the thickness T2 of a front-side portion of the protective layer which faces the front end of the first specific protective layer is 1.0 or less.

5 Claims, 6 Drawing Sheets

(56) References Cited

U.S. PATENT DOCUMENTS

2020/0064305 A1    2/2020   Nakayama et al.
2020/0309734 A1   10/2020   Kai et al.

FOREIGN PATENT DOCUMENTS

| JP | 2020-165693 A | 10/2020 |
| JP | 2021-43224 A | 3/2021 |
| WO | 2019/155865 A1 | 8/2019 |
| WO | 2019/155867 A1 | 8/2019 |

OTHER PUBLICATIONS

International Search Report of PCT/JP2022/008590 dated Apr. 26, 2022.
International Preliminary Report on Patentability received in corresponding International Application No. PCT/JP2022/008590 dated Oct. 12, 2023.

* cited by examiner

SENSOR ELEMENT AND GAS SENSOR

CROSS-REFERENCE TO RELATED APPLICATION

This application is a continuation application of PCT/JP2022/008590, filed on Mar. 1, 2022, which claims the benefit of priority of Japanese Patent Application No. 2021-057627, filed on Mar. 30, 2021, the entire contents of which are incorporated herein by reference.

BACKGROUND OF THE INVENTION

1. Field of the Invention

The present invention relates to a sensor element and a gas sensor.

2. Description of the Related Art

Sensor elements that detect the specific gas concentration, such as NOx, in the measurement-object gas, such as an automotive exhaust gas, are known (e.g., PTL 1). The sensor element described in PTL 1 includes a long-length element body; an outer electrode, an outer lead portion, and a connector electrode that are disposed on the upper surface of the element body; and a porous layer that covers the outer electrode and the outer lead portion. The outer electrode, the outer lead portion, and the connector electrode are connected to and in electrical conduction with one another in this order. The connector electrode is electrically connected to the outside. The sensor element described in PTL 1 also includes a dense layer arranged to divide the porous layer in the longitudinal direction of the element body. The dense layer covers the outer lead portion. Since moisture is unlikely to pass through the dense layer, in the case where moisture included in the measurement-object gas moves inside the porous layer by the capillarity, the presence of the dense layer reduces the likelihood of the moisture reaching the connector electrode.

CITATION LIST

Patent Literature

PTL 1: WO 2019/155865 A1

SUMMARY OF THE INVENTION

There has been a demand for a further reduction in the likelihood of the moisture reaching the connector electrode of a sensor element including a protective layer that protects the element body, such as the porous layer described in PTL 1.

The present invention was made in order to address the above issues. An object of the present invention is to prevent the moisture from reaching the connector electrodes.

The present invention employs the following structures in order to achieve the object.

The sensor element according to the present invention is a sensor element for detection of a specific gas concentration in a measurement-object gas, the sensor element including: a long-length element body including front and rear ends and one or more side surfaces, the front and rear ends being ends of the element body in a longitudinal direction of the element body, the one or more side surfaces being surfaces extending in the longitudinal direction; one or more connector electrodes disposed on the rear end-side part of any of the one or more side surfaces, the one or more connector electrodes for being in electrical conduction with an outside; and a protective layer that covers at least the front end-side part of the side surface on which the one or more connector electrodes are disposed, wherein the protective layer includes a specific protective layer having a thickness T1 of 10 μm or less, and wherein a ratio T1/T2 of the thickness T1 to a thickness T2 of a front-side portion of the protective layer, the front-side portion facing a front end of the specific protective layer, is 1.0 or less.

In the above sensor element, the thickness T1 of the specific protective layer included in the protective layer is 10 μm or less and the ratio T1/T2 is 1.0 or less. The presence of the specific protective layer, which has a relatively small thickness, reduces the likelihood of the moisture passing through the specific protective layer. This reduces the likelihood of the moisture reaching the connector electrode through the protective layer. In this case, the thickness T1 may be 1 μm or more.

In the sensor element according to the present invention, the ratio T1/T2 may be 1.0. In other words, the specific protective layer may have the same thickness as the front-side portion. In this case, the specific protective layer and the front-side portion may be indistinguishable from each other. Even in the case where they are indistinguishable from each other, it is considered that the condition "the specific protective layer has a thickness T1 of 10 μm or less and the ratio T1/T2 is 1.0 or less" is satisfied when at least a part of the protective layer has a thickness of 10 μm or less. For example, the entirety of the protective layer may have a thickness of 10 μm or less.

In the sensor element according to the present invention, the ratio T1/T2 is preferably less than 1.0. In other words, the specific protective layer preferably has a smaller thickness than the front-side portion. The ratio T1/T2 may be 0.1 or more.

In the sensor element according to the present invention, the ratio T1/T2 may be 0.6 or less. When the ratio T1/T2 is 0.6 or less, the specific protective layer included in the protective layer, which has a relatively small thickness, further reduces the passage of the moisture and the front-side portion of the protective layer which faces the front end of the specific protective layer, which has a relatively large thickness, retains the moisture. Therefore, when the ratio T1/T2 is 0.6 or less, the passage of the moisture through the specific protective layer can be further reduced.

In the sensor element according to the present invention, the thickness T1 may be less than 5 μm. When the thickness T1 is less than 5 μm, the passage of the moisture through the specific protective layer can be further reduced. Therefore, the likelihood of the moisture reaching the connector electrode through the protective layer can be further reduced.

In the sensor element according to the present invention, the specific protective layer may have a porosity of less than 10%. In such a case, since the porosity of the specific protective layer is less than 10%, that is, the specific protective layer is dense, the passage of the moisture through the specific protective layer can be further reduced.

The sensor element according to the present invention may include a detection unit including a plurality of electrodes disposed in a front end-side part of the element body, the detection unit detecting the specific gas concentration in the measurement-object gas, and an outer lead portion disposed on the side surface on which the one or more connector electrodes are disposed, the outer lead portion providing electrical conduction between any of the plurality of electrodes and one of the one or more connector electrodes. In such a case, the outer lead portion can be protected by the protective layer.

The gas sensor according to the present invention includes the sensor element according to any one of the above-described aspects. Therefore, the gas sensor has the same advantageous effects as the above-described sensor element according to the present invention. That is, for example, the gas sensor is capable of reducing the likelihood of the moisture reaching the connector electrodes.

DETAILED DESCRIPTION OF THE INVENTION

Figure 1:
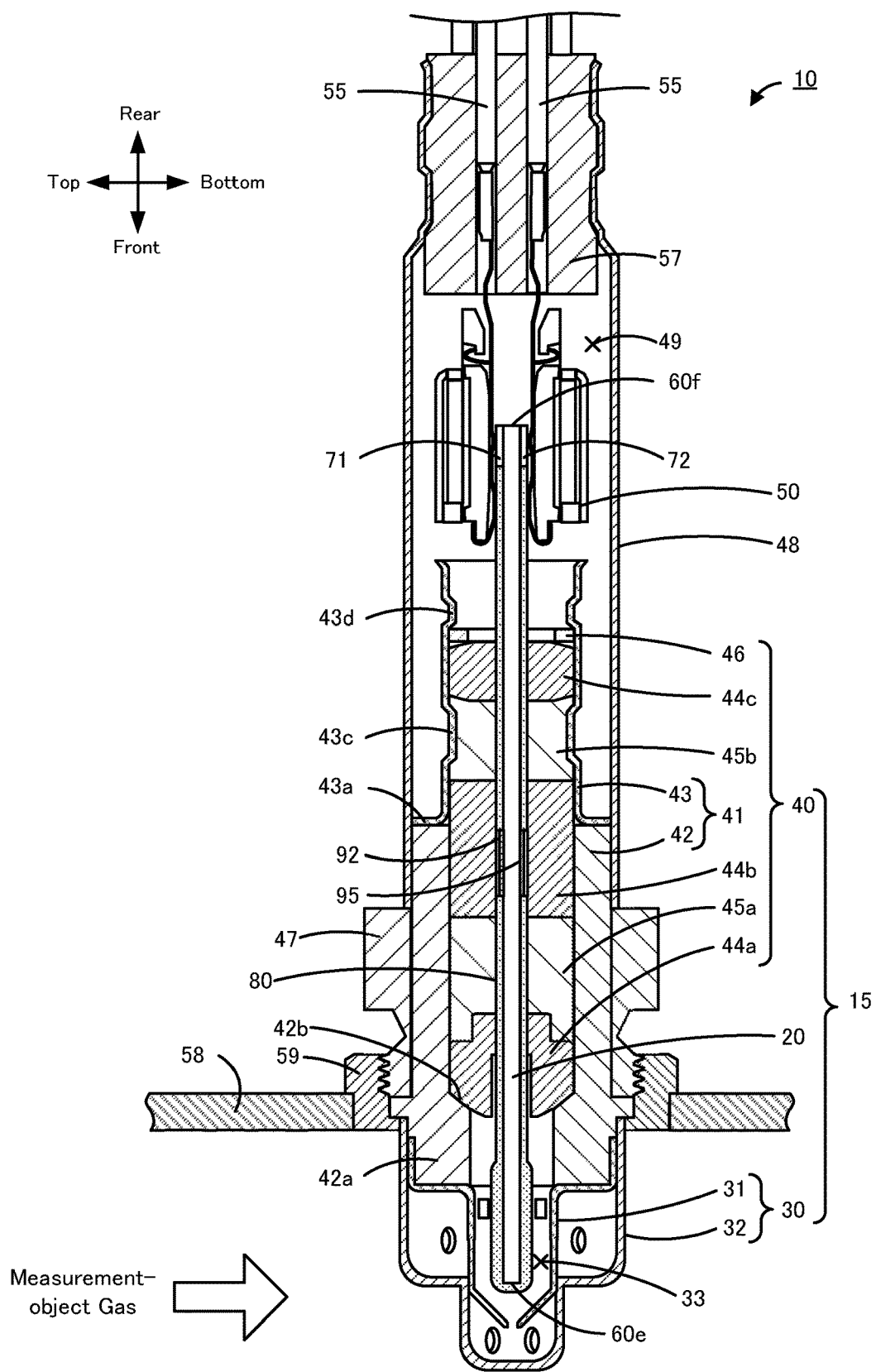
FIG. 1 is a vertical cross-sectional view of a gas sensor 10 attached to a pipe 58.
Figure 2:
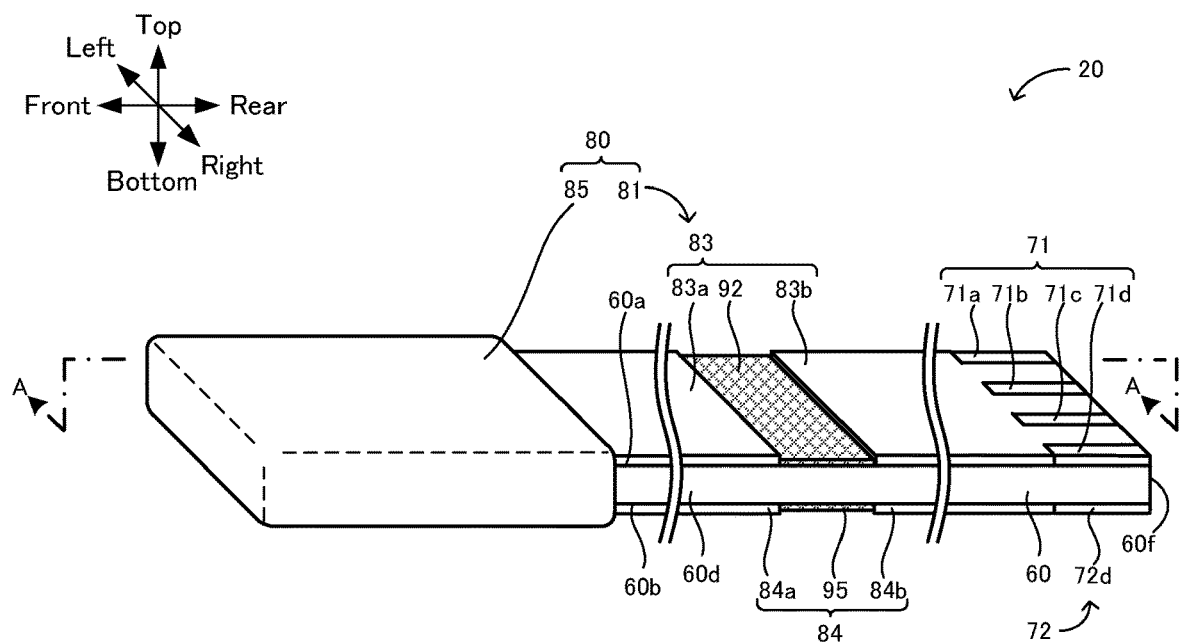
FIG. 2 is a perspective view of a sensor element 20.
Figure 3:
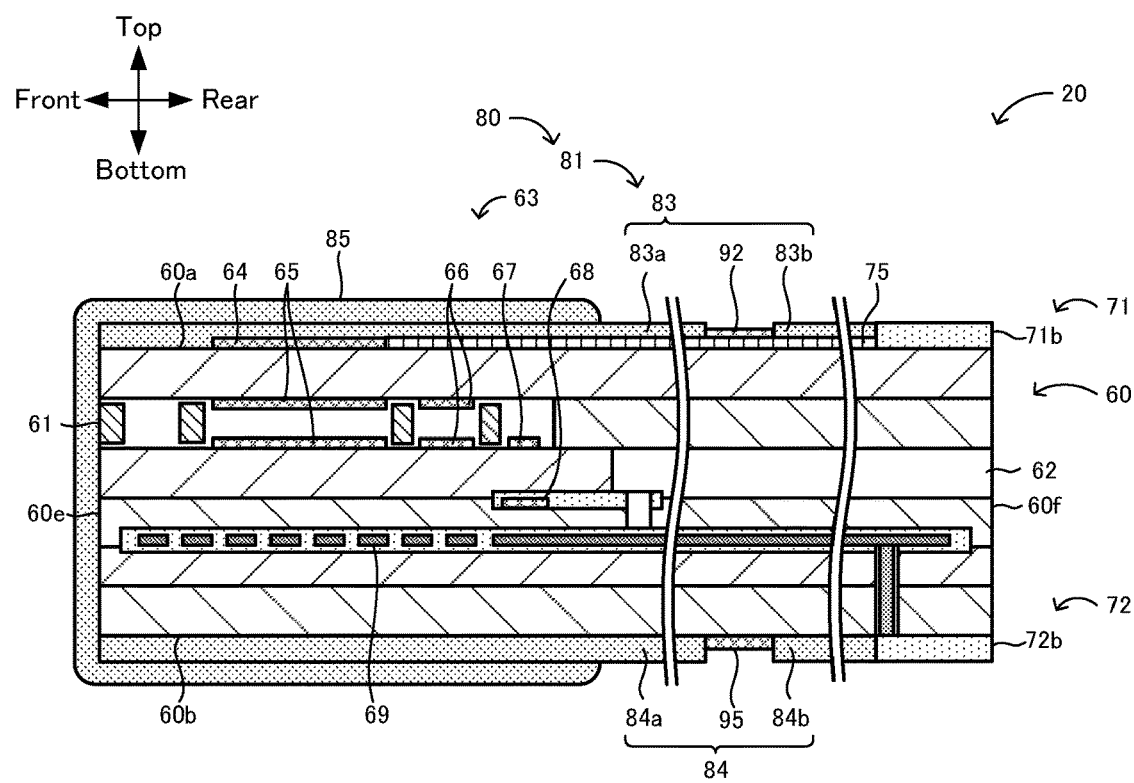
FIG. 3 is a cross-sectional view taken along the line A-A of FIG. 2.
Figure 4:
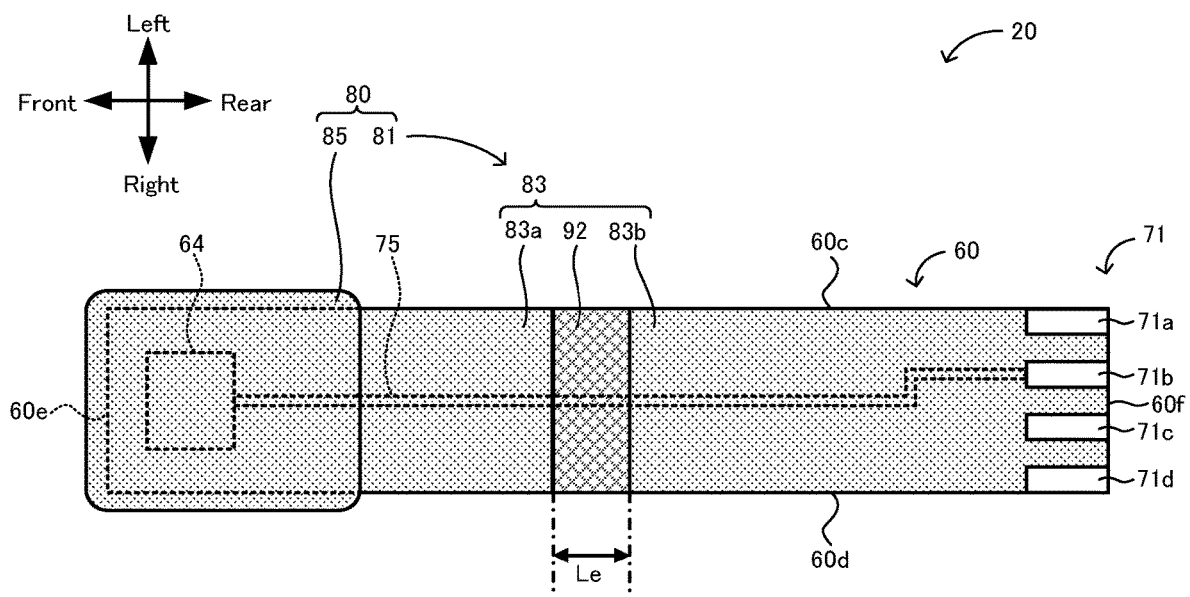
FIG. 4 is a top view of the sensor element 20.
Figure 5:
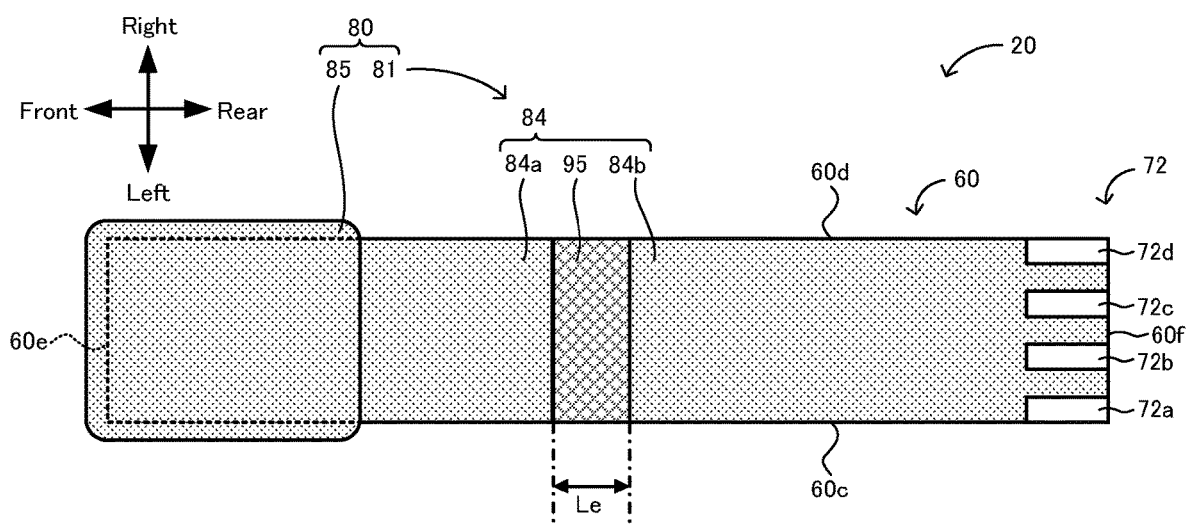
FIG. 5 is a bottom view of the sensor element 20.
Figure 6:
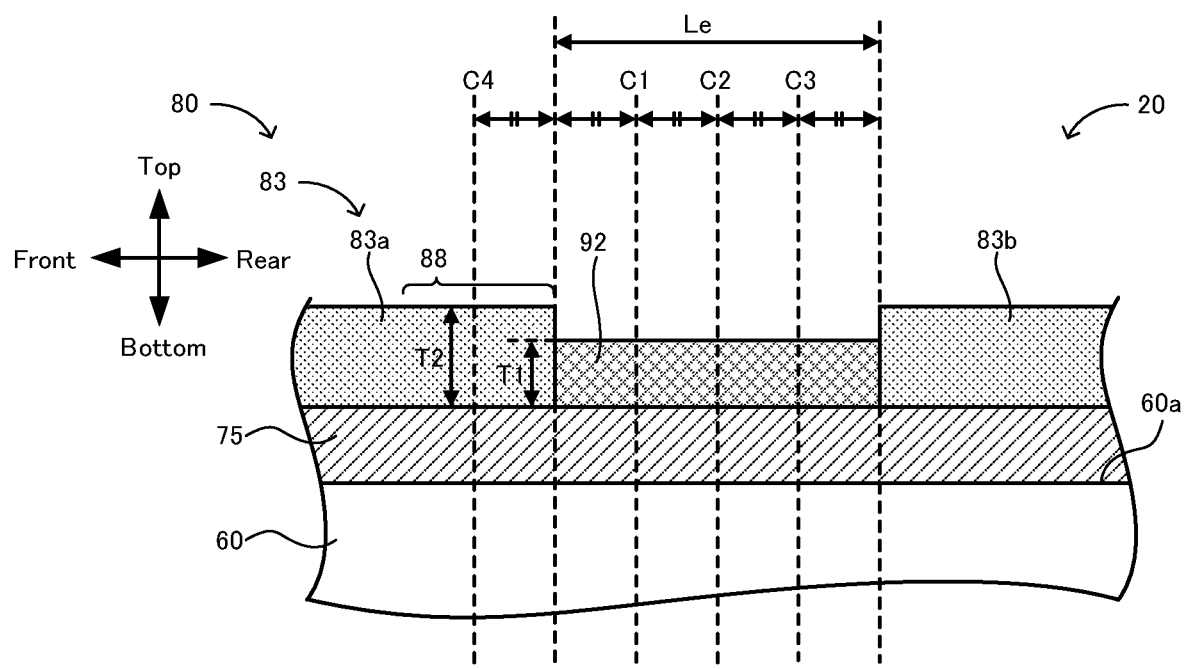
FIG. 6 is an enlarged partial cross-sectional view of the periphery of a first specific protective layer 92.

Embodiments of the present invention are described below with reference to the attached drawings. FIG. 1 is a vertical cross-sectional view of a gas sensor 10 according to an embodiment of the present invention which is attached to a pipe 58. FIG. 2 is a perspective view of a sensor element 20 viewed from the upper right front. FIG. 3 is a cross-sectional view taken along the line A-A of FIG. 2. FIG. 4 is a top view of the sensor element 20. FIG. 5 is a bottom view of the sensor element 20. FIG. 6 is an enlarged partial cross-sectional view of the periphery of a first specific protective layer 92. In this embodiment, as illustrated in FIGS. 2 and 3, the longitudinal direction of an element body 60 included in the sensor element 20 is referred to as "front-to-rear direction" (length direction), the direction in which layers constituting the element body 60 are stacked (thickness direction) is referred to as "top-to-bottom direction", and a direction perpendicular to the front-to-rear direction and the top-to-bottom direction is referred to as "left-to-right direction" (width direction).

As illustrated in FIG. 1, the gas sensor 10 includes an assembly 15, a bolt 47, an external cylinder 48, a connector 50, lead wires 55, and a rubber stopper 57. The assembly 15 includes a sensor element 20, a protective cover 30, and an element-sealing member 40. The gas sensor 10 is attached to a pipe 58, such as an automotive exhaust gas pipe, and used for measuring the specific gas concentration, such as NOx or $O_2$, (particular gas concentration) in the exhaust gas, which is the gas to be analyzed. In this embodiment, the gas sensor 10 is a gas sensor that measures NOx concentration as a particular gas concentration. Among the ends (front and rear ends) of the sensor element 20 in the longitudinal direction, the front end-side part of the sensor element 20 is exposed to the measurement-object gas.

The protective cover 30 includes, as illustrated in FIG. 1, a hollow cylindrical inner protective cover 31 with a bottom which covers the front end-part of the sensor element 20 and a hollow cylindrical outer protective cover 32 with a bottom which covers the inner protective cover 31. Each of the inner and outer protective covers 31 and 32 has a plurality of holes formed therein, through which the measurement-object gas is passed. The space surrounded by the inner protective cover 31 serves as an element chamber 33. A fifth surface 60e (front end-side surface) of the sensor element 20 is located inside the element chamber 33.

The element-sealing member 40 is a member with which the sensor element 20 is sealed and fixed. The element-sealing member 40 includes a cylindrical body 41 including a main fitting 42 and an inner cylinder 43, insulators 44a to 44c (example of a dense body), compacts 45a and 45b, and a metal ring 46. The sensor element 20 is located on the central axis of the element-sealing member 40 and penetrates the element-sealing member 40 in the front-to-rear direction.

The main fitting 42 is a hollow cylindrical member made of a metal. The front-side part of the main fitting 42 is a thick-wall portion 42a having a smaller inside diameter than the rear-side part of the main fitting 42. The protective cover 30 is attached to a part of the main fitting 42 which is on the same side as the front end-side of the sensor element 20 (front-side part of the main fitting 42). The rear end of the main fitting 42 is welded to a flange portion 43a of the inner cylinder 43. A part of the inner peripheral surface of the thick-wall portion 42a serves as a bottom surface 42b, which is a stepped surface. The bottom surface 42b holds the insulator 44a such that the insulator 44a does not protrude forward.

The inner cylinder 43 is a hollow cylindrical member made of a metal and includes the flange portion 43a formed at the front end of the inner cylinder 43. The inner cylinder 43 and the main fitting 42 are coaxially fixed to each other by welding. The inner cylinder 43 includes a diameter reduction portion 43c that presses the compact 45b toward the central axis of the inner cylinder 43 and a diameter reduction portion 43d that presses the insulators 44a to 44c and the compacts 45a and 45b in the downward direction in FIG. 1 with the metal ring 46 interposed therebetween, the diameter reduction portions 43c and 43d being formed in the inner cylinder 43.

The insulators 44a to 44c and the compacts 45a and 45b are interposed between the inner peripheral surface of the cylindrical body 41 and the sensor element 20. The insulators 44a to 44c serve as a support for the compacts 45a and 45b. Examples of the material constituting the insulators 44a to 44c include ceramics, such as alumina, steatite, zirconia, spinel, cordierite, and mullite, and glass. The insulators 44a to 44c are dense members and have a porosity of, for example, less than 1%. Each of the insulators 44a to 44c has a through-hole formed therein so as to penetrate the insulator in the axial direction (in this embodiment, in the front-to-rear direction). The sensor element 20 is disposed in the through-hole so as to penetrate the through-hole. In this embodiment, the cross sections of the through-holes of the insulators 44a to 44c which are perpendicular to the axial direction have a rectangular shape, which match the shape of the sensor element 20. The compacts 45a and 45b are formed by, for example, molding a powder and serve as a sealing medium. Examples of the material constituting the compacts 45a and 45b include talc and ceramic powders, such as an alumina powder and boron nitride. The compacts 45a and 45b may include at least one of the above materials. The compact 45a is filled between the insulators 44a and 44b and pressed by the insulators 44a and 44b as a result of both (front and rear) ends of the compact 45a in the axial direction being sandwiched therebetween. The compact 45b is filled between the insulators 44b and 44c and pressed by the insulators 44b and 44c as a result of both (front and rear) ends of the compact 45b in the axial direction being sandwiched therebetween. The insulators 44a to 44c and the compacts 45a and 45b are sandwiched between the diameter reduction portion 43d and the metal ring 46, and the bottom surface 42b of the thick-wall portion 42a of the main fitting 42 and thereby pressed in the front-to-rear direction. As a result of the compacts 45a and 45b being compressed between the cylindrical body 41 and the sensor element 20 by the pressing force applied by the diameter reduction portions 43c and 43d, the compacts 45a and 45b seal the communication between the element chamber 33 formed inside the protective cover 30 and a space 49 created inside the external cylinder 48 and fix the sensor element 20.

The bolt 47 is fixed to the outer surface of the main fitting 42 coaxially with the main fitting 42. The bolt 47 includes a male thread portion formed in the outer peripheral surface of the nut 47. The male thread portion is inserted into a fixing member 59, which is welded to the pipe 58 and includes a female thread portion formed in the inner peripheral surface of the fixing member 59. This enables the gas sensor 10 to be fixed to the pipe 58 while the front end-side part of the sensor element 20 of the gas sensor 10 and the protective cover 30 of the gas sensor 10 are protruded toward the inside of the pipe 58.

The external cylinder 48 is a hollow cylindrical member made of a metal and covers the inner cylinder 43, the rear end-side part of the sensor element 20, and the connector 50. The upper part of the main fitting 42 is inserted into the external cylinder 48. The lower end of the external cylinder 48 is welded to the main fitting 42. A plurality of the lead wires 55, which are connected to the connector 50, are drawn from the upper end of the external cylinder 48 to the outside. The connector 50 is in contact with upper and lower connector electrodes 71 and 72 disposed on the rear end-side parts of the surfaces of the sensor element 20 and electrically connected to the sensor element 20. The lead wires 55 are in electrical conduction with electrodes 64 to 68 and a heater 69, which are included in the sensor element 20, via the connector 50. The gap between the external cylinder 48 and the lead wires 55 is sealed with the rubber stopper 57. The space 49 inside the external cylinder 48 is filled with a reference gas. A sixth surface 60f (rear end-side surface) of the sensor element 20 is located inside the space 49.

The sensor element 20 includes an element main body 60, a detection unit 63, a heater 69, an upper connector electrode 71, a lower connector electrode 72, and a protective layer 80 as illustrated in FIGS. 2 to 5. The element main body 60 includes a multilayer body constituted by a plurality of (6 layers in FIG. 3) oxygen ion-conducting solid-electrolyte layers composed of zirconia ($ZrO_2$) or the like which are stacked on top of one another. The element main body 60 has a long-length, rectangular cuboid shape, and the longitudinal direction of the element main body 60 is parallel to the front-to-rear direction. The element main body 60 has first to sixth surfaces 60a to 60f, which are the upper, lower, left, right, front, and rear outer surfaces of the element main body 60. The first to fourth surfaces 60a to 60d are surfaces that extend in the longitudinal direction of the element main body 60 and correspond to the side surfaces of the element main body 60. The fifth surface 60e is the front end-side surface of the element main body 60. The sixth surface 60f is the rear end-side surface of the element main body 60. The dimensions of the element main body 60 may be, for example, 25 mm or more and 100 mm or less long, 2 mm or more and 10 mm or less wide, and 0.5 mm or more and 5 mm or less thick. The element main body 60 includes a gas-to-be-analyzed introduction port 61 formed in the fifth surface 60e, through which the measurement-object gas is introduced into the element main body 60, and a reference gas introduction port 62 formed in the sixth surface 60f, through which a reference gas (in this embodiment, air) used as a reference for detecting the particular gas concentration is introduced into the element main body 60.

The detection unit 63 detects the specific gas concentration in the measurement-object gas. The detection unit 63 includes a plurality of electrodes disposed in the front end-side part of the element main body 60. In this embodiment, the detection unit 63 includes an outer electrode 64 disposed on the first surface 60a and an inner main pump electrode 65, an inner auxiliary pump electrode 66, a measurement electrode 67, and a reference electrode 68 that are disposed inside the element main body 60. The inner main pump electrode 65 and the inner auxiliary pump electrode 66 are disposed on the inner peripheral surface of a cavity formed inside the element main body 60 and have a tunnel-like structure.

Since the principle on which the detection unit 63 detects the specific gas concentration in the measurement-object gas is publicly known, detailed description is omitted herein. The detection unit 63 detects the particular gas concentration, for example, in the following manner. The detection unit 63 draws oxygen included in the measurement-object gas which is in the vicinity of the inner main pump electrode 65 to or from the outside (the element chamber 33) on the basis of the voltage applied between the outer electrode 64 and the inner main pump electrode 65. The detection unit 63 also draws oxygen included in the measurement-object gas which is in the vicinity of the inner auxiliary pump electrode 66 to or from the outside (the element chamber 33) on the basis of the voltage applied between the outer electrode 64 and the inner auxiliary pump electrode 66. This enables the measurement-object gas to reach a space around the measurement electrode 67 after the oxygen concentration in the gas has been adjusted to be a predetermined value. The measurement electrode 67 serves as a NOx-reducing catalyst and reduces the particular gas (NOx) included in the measurement-object gas. The detection unit 63 converts an electromotive force generated between the measurement electrode 67 and the reference electrode 68 in accordance with the oxygen concentration in the reduced gas or a current that flows between the measurement electrode 67 and the outer electrode 64 on the basis of the electromotive force into an electrical signal. The electrical signal generated by the detection unit 63 indicates the value reflective of the particular gas concentration in the measurement-object gas (the value from which the particular gas concentration can be derived) and corresponds to the value detected by the detection unit 63.

The heater 69 is an electric resistor disposed inside the element main body 60. Upon the heater 69 being fed with power from the outside, the heater 69 generates heat and heats the element main body 60. The heater 69 is capable of heating the solid-electrolyte layers constituting the element main body 60 and conserving the heat such that the temperature is adjusted to be the temperature (e.g., 800° C.) at which the solid-electrolyte layers become active.

The upper connector electrode 71 and the lower connector electrode 72 are each disposed on the rear end-side part of any of the side surfaces of the element main body 60. The upper connector electrode 71 and the lower connector electrode 72 are electrodes that enable electrical conduction between the element main body 60 and the outside. The upper and lower connector electrodes 71 and 72 are not covered with the protective layer 80 and exposed to the outside. In this embodiment, four upper connector electrodes 71a to 71d, which serve as an upper connector electrode 71, are arranged in the left-to-right direction and disposed on the rear end-side part of the first surface 60a, and four lower connector electrodes 72a to 72d, which serve as a lower connector electrode 72, are arranged in the left-to-right direction and disposed on the rear end-side part of the second surface 60b (lower surface), which is opposite to the first surface 60a (upper surface). Each of the connector electrodes 71a to 71d and 72a to 72d is in electrical conduction with any of the electrodes 64 to 68 and the heater 69 included in the detection unit 63. In this embodiment, the upper connector electrode 71a is in conduction with the measurement electrode 67; the upper connector electrode 71b is in conduction with the outer electrode 64; the upper connector electrode 71c is in conduction with the inner auxiliary pump electrode 66; the upper connector electrode 71d is in conduction with the inner main pump electrode 65; the lower connector electrodes 72a to 72c are each in conduction with the heater 69; and the lower connector electrode 72d is in conduction with the reference electrode 68. The upper connector electrode 71b and the outer electrode 64 are in conduction with each other via an outer lead wire 75 disposed on the first surface 60a (see FIGS. 3 and 4). Each of the other connector electrodes is in conduction with a corresponding one of the electrodes and the heater 69 via a lead wire, through-hole, or the like formed inside the element main body 60.

The outer lead wire 75 is a conductive material including a noble metal, such as platinum (Pt), or a high-melting point metal, such as tungsten (W) or molybdenum (Mo). The outer lead wire 75 is preferably a cermet conductive material that includes the noble metal or high-melting point metal and the oxygen-ion-conductive solid electrolyte (in this embodiment, zirconia) included in the element body 60. In this embodiment, the outer lead wire 75 is a cermet conductive material that includes platinum and zirconia. The porosity of the outer lead wire 75 may be, for example, 5% or more and 40% or less. The line width (thickness, i.e., width in the left-to-right direction) of the outer lead wire 75 is, for example, 0.1 mm or more and 1.0 mm or less. An insulating layer, which is not illustrated in the drawings, may be interposed between the outer lead wire 75 and the first surface 60a of the element body 60 in order to provide electrical insulation between the outer lead wire 75 and the solid electrolyte layer of the element body 60.

The protective layer 80 covers at least the front end-side parts of the side surfaces of the element body 60 on which the upper and lower connector electrodes 71 and 72 are disposed, that is, the first and second surfaces 60a and 60b. In this embodiment, the protective layer 80 includes an inner protective layer 81 that covers the first and second surfaces 60a and 60b and an outer protective layer 85 disposed on the outer surface of the inner protective layer 81.

The inner protective layer 81 includes a first inner protective layer 83 that covers the first surface 60a and a second inner protective layer 84 that covers the second surface 60b. The first inner protective layer 83 covers the entirety of the region extending from the front end to the rear end of the first surface 60a on which the upper connector electrodes 71a to 71d are disposed, except the region in which the upper connector electrode 71 is present (see FIGS. 2 to 4). The width of the first inner protective layer 83 in the left-to-right direction is equal to the width of the first surface 60a in the left-to-right direction. The first inner protective layer 83 covers the region that extends from the left end to the right end of the first surface 60a. The first inner protective layer 83 includes a first specific protective layer 92, a front end-side portion 83a located on the front end-side across the first specific protective layer 92, and a rear end-side portion 83b located on the rear end-side across the first specific protective layer 92. The rear end of the front end-side portion 83a is in contact with the front end of the first specific protective layer 92. The rear end of the first specific protective layer 92 is in contact with the front end of the rear end-side portion 83b. The first inner protective layer 83 covers at least a part of the outer electrode 64 and at least a part of the outer lead wire 75. In this embodiment, the front end-side portion 83a of the first inner protective layer 83 covers the entirety of the outer electrode 64 as illustrated in FIGS. 3 and 4. The first inner protective layer 83 covers the entirety of the outer lead wire 75. The first inner protective layer 83 protects the first surface 60a-side part of the element body 60. The first inner protective layer 83 protects the outer electrode 64 and the outer lead wire 75 from the components of the measurement-object gas, such as sulfuric acid, and suppresses the corrosion and the like of the outer electrode 64 and the outer lead wire 75. Details of the mechanisms are described below. However, in particular, the first specific protective layer 92 included in the first inner protective layer 83 reduces the likelihood of the moisture moving through the element body 60 in the longitudinal direction and reaching the upper connector electrode 71.

The first specific protective layer 92 is disposed backward of any of the electrodes 64 to 68 included in the detection unit 63, including the outer electrode 64 (see FIG. 3). The first specific protective layer 92 is disposed at a position that is not exposed to the measurement-object gas, that is, a position that is not exposed to the element chamber 33. In this embodiment, the first specific protective layer 92 is interposed between the element-sealing member 40 and the element body 60. Specifically, the first specific protective layer 92 is arranged to overlap the insulator 44b in the front-to-rear direction (see FIG. 1). In other words, the region that extends from the front to rear ends of the first specific protective layer 92 is included in the region that extends from the front to rear ends of the insulator 44b.

The second inner protective layer 84 covers the entirety of the region extending from the front end to the rear end of the second surface 60b on which the lower connector electrodes 72a to 72d are disposed, except the region in which the lower connector electrode 72 is present (see FIGS. 2, 3, and 5). The width of the second inner protective layer 84 in the left-to-right direction is equal to the width of the second surface 60b in the left-to-right direction. The second inner protective layer 84 covers the region that extends from the left end to the right end of the second surface 60b. The second inner protective layer 84 includes a second specific protective layer 95, a front end-side portion 84a located on the front end-side across the second specific protective layer 95, and a rear end-side portion 84b located on the rear end-side across the second specific protective layer 95. The rear end of the front end-side portion 84a is in contact with the front end of the second specific protective layer 95. The rear end of the second specific protective layer 95 is in contact with the front end of the rear end-side portion 84b. The second inner protective layer 84 protects the second surface 60b-side part of the element body 60. Details of the mechanisms are described below. However, in particular, the second specific protective layer 95 included in the second inner protective layer 84 reduces the likelihood of the moisture moving through the element body 60 in the longitudinal direction and reaching the lower connector electrode 72.

The second specific protective layer 95 is disposed backward of any of the electrodes 64 to 68 included in the detection unit 63, including the outer electrode 64 (see FIG. 3). The second specific protective layer 95 is disposed at a position that is not exposed to the measurement-object gas, that is, a position that is not exposed to the element chamber 33. In this embodiment, the second specific protective layer 95 is interposed between the element-sealing member 40 and the element body 60. Specifically, the second specific protective layer 95 is arranged to overlap the insulator 44b in the front-to-rear direction (see FIG. 1). In other words, the region that extends from the front to rear ends of the second specific protective layer 95 is included in the region that extends from the front to rear ends of the insulator 44b.

The outer protective layer 85 covers the first to fifth surfaces 60a to 60e. The outer protective layer 85 covers the first surface 60a and the second surface 60b as a result of covering the inner protective layer 81. The length of the outer protective layer 85 in the front-to-rear direction is smaller than the length of the inner protective layer 81 in the front-to-rear direction. The outer protective layer 85 covers only the front end of the element body 60 and a region of the element body 60 around the front end, unlike the inner protective layer 81. Thus, the outer protective layer 85 covers a part of the element body 60 which surrounds the electrodes 64 to 68 included in the detection unit 63. In other words, the outer protective layer 85 covers a part of the element body 60 which is disposed inside the element chamber 33 and exposed to the measurement-object gas. Thereby, the outer protective layer 85 reduces the likelihood of moisture and the like included in the measurement-object gas adhering to the element body 60 and causing cracking of the element body 60. The thickness of the outer protective layer 85 may be, for example, 40 µm or more and 800 µm or less.

The first specific protective layer 92 included in the first inner protective layer 83 has a thickness T1 of 10 µm or less. Furthermore, when the thickness of a front-side portion 88 of the first inner protective layer 83 which faces the front end of the first specific protective layer 92 (see FIG. 6) is defined as a thickness T2, the ratio T1/T2 of the thickness T1 to the thickness T2 is 1.0 or less. Since the first specific protective layer 92 has a thickness T1 of 10 µm or less, that is, a relatively small thickness, a channel formed in the first specific protective layer 92 through which the moisture can pass is narrowed. As a result, the first specific protective layer 92 serves as a water-penetration reduction portion that reduces the capillarity of water through the element body 60 in the longitudinal direction. This reduces the likelihood of moisture that moves backward inside the front end-side portion 83a of the protective layer 80 by capillarity passing through the first specific protective layer 92 and reaching the upper connector electrode 71. The front-side portion 88 is a portion of the protective layer 80 which is the closest to the first specific protective layer 92 and faces the front end of the first specific protective layer 92. In this embodiment, as illustrated in FIG. 6, the front-side portion 88 is a part of the front end-side portion 83a and a rear end-side part of the front end-side portion 83a.

The ratio T1/T2 is preferably less than 1.0. In other words, the first specific protective layer 92 preferably has a smaller thickness than the front-side portion 88. The ratio T1/T2 is more preferably 0.6 or less. When the ratio T1/T2 is 0.6 or less, the first specific protective layer 92 included in the protective layer 80, which has a relatively small thickness, further reduces the passage of the moisture and the front end-side portion 83a (in particular, the front-side portion 88), which has a relatively large thickness, enables the moisture to be retained in the front end-side portion 83a. Therefore, when the ratio T1/T2 is 0.6 or less, the passage of the moisture through the first specific protective layer 92 can be further reduced. The ratio T1/T2 may be 0.1 or more.

The thickness T1 of the first specific protective layer 92 is preferably 1 µm or more. When the thickness T1 is 1 µm or more, the first specific protective layer 92 is capable of protecting the outer lead wire 75 and the first surface 60a. The thickness T1 is preferably less than 5 µm and is more preferably 4.5 µm or less. When the thickness T1 is less than 5 µm, the passage of the moisture through the first specific protective layer 92 can be further reduced. Therefore, the likelihood of the moisture reaching the upper connector electrode 71 through the protective layer 80 can be further reduced. Furthermore, in the case where the thickness T1 is less than 5 µm, the likelihood of the moisture passing through the first specific protective layer 92 and reaching the upper connector electrode 71 can be reduced to a sufficient degree even when the ratio T1/T2 is 1.0, that is, the ratio T1/T2 is not less than 1.0.

The thickness T2 may be 5 µm or more, may be 7 µm or more, and may be 10 µm or more. The thickness T2 may be 40 µm or less and may be 20 µm or less.

Figure 7:
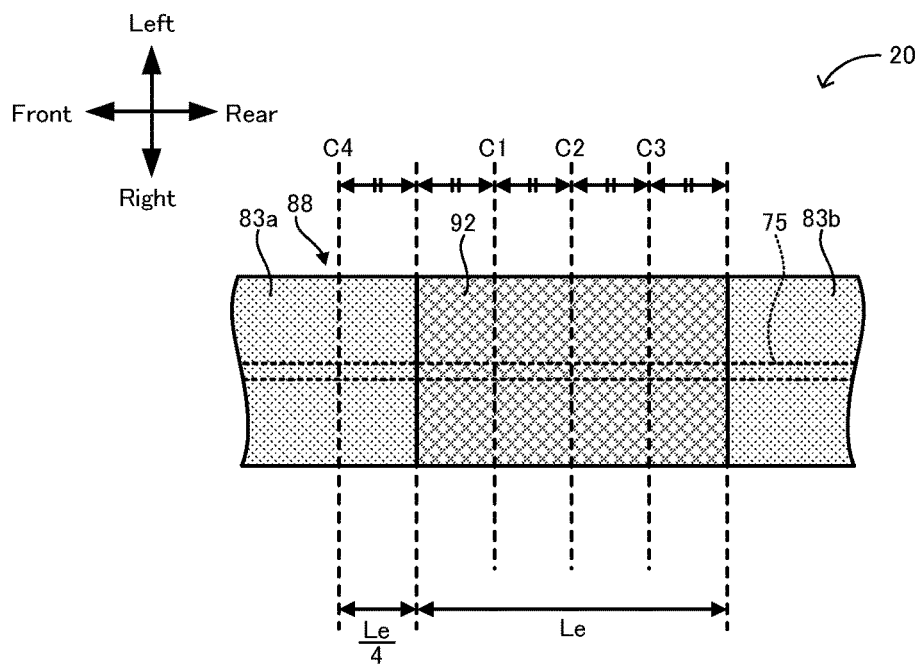
FIG. 7 is a top view illustrating the positions of sections C1 to C4, at which thicknesses T1 and T2 are observed.
Figure 8:
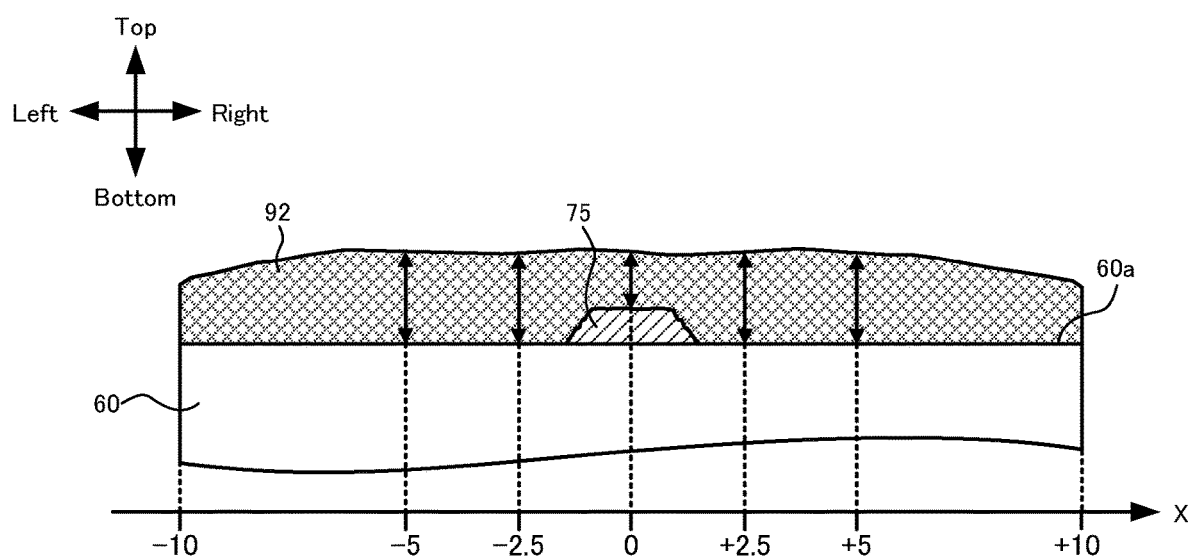
FIG. 8 is a schematic diagram illustrating a SEM image of the section C1.

The thickness T1, the thickness T2, and the ratio T1/T2 are values measured in the following manner using images (SEM images) obtained by observation with a scanning electron microscope (SEM). FIG. 7 is a top view illustrating the positions of sections C1 to C4, at which thicknesses T1 and T2 are observed. FIG. 8 is a schematic diagram illustrating a SEM image of the section C1. The positions of the sections C1 to C4 are also illustrated in FIG. 6. First, as illustrated in FIG. 7, three sections, that is, sections C1, C2, and C3, which divide the first specific protective layer 92 into four equal parts are determined with reference to the front and rear ends of the first specific protective layer 92. In addition, the position Le/4 forward of the front end of the first specific protective layer 92, that is, the rear end of the front end-side portion 83a, is defined as the position of the section C4, where the length Le is the length of the first specific protective layer 92 in the front-to-rear direction (see FIGS. 4, 6, and 7). Then, the sensor element 20 is cut in the thickness direction of the first specific protective layer 92 and the front end-side portion 83a such that the sections C1 to C4 can be observation sections. Each of the cross sections (sections C1 to C4) is buried in a resin and ground in order to prepare observation samples. An image of each of the observation sections of the observation samples is taken with a SEM at a 200 to 500-fold magnification in order to obtain SEM images of the sections C1 to C4. The sections C1 to C4 are the front surfaces of pieces of the sensor element 20. That is, the direction in which the sections C1 to C4 are observed is the direction from forward to backward. Subsequently, the five points at which thickness is measured in the SEM image of the section C1 are determined. Specifically, as illustrated in FIG. 8, the left-to-right direction of the SEM image of the section C1 is defined as the X-axis. The X-coordinates of the left and right ends of the first specific protective layer 92 in the section C1 are defined as −10 and +10, respectively. The five points in the section C1 the X-coordinates of which are −5, −2.5, 0, +2.5, and +5 are set to the points at which thickness is measured. The thickness of the first specific protective layer 92 is measured at each of the above measurement points. In the sections C2 and C3, the thickness of the first specific protective layer 92 is also measured at each of the above five measurement points by the same method as described above. The average of the thicknesses of the first specific protective layer 92 which are measured at the above 15 points in total is used as a thickness T1. In the section C4, the X-coordinates of the left and right ends of the front end-side portion 83a (front-side portion 88) are also defined as −10 and +10, respectively, and the five points at which thickness is measured are determined as in the sections C1 to C3. The average of the thicknesses of the front end-side portion 83a (front-side portion 88) which are measured at the five points in the section C4 is used as a thickness T2. The ratio T1/T2 is calculated on the basis of the thicknesses T1 and T2 measured. As illustrated in FIG. 8, the thickness of the first specific protective layer 92 may vary by position and may be reduced at a position immediately above the outer lead wire 75 compared with the other positions. Therefore, the thickness T1 is the average of the 15 points as described above. For the same reasons as above, the thickness T2 is a five-point average. Moreover, in consideration of the property of the front end-side portion 83a, which has a large thickness, to retain the moisture, the thickness of the front-side portion 88, which is the portion of the front end-side portion 83a which is closest the first specific protective layer 92, is defined as thickness T2, and the thickness T2 is measured at the positions in the section C4, which are defined as described above.

The entirety of the front end-side portion 83a may have a thickness equal to the thickness T2 of the front-side portion 88. The front end-side portion 83a may have the same thickness as the rear end-side portion 83b. The thickness of the rear end-side portion 83b may be smaller than the thickness T1 of the first specific protective layer 92.

In this embodiment, the thickness of the second inner protective layer 84 is set similarly to the thickness of the first inner protective layer 83. In other words, the thickness T1 of the second specific protective layer 95 is 10 μm or less. Furthermore, when the thickness of a front-side portion of the second inner protective layer 84 which faces the front end of the second specific protective layer 95 (i.e., rear end-side part of the front end-side portion 84a) is defined as a thickness T2, the ratio T1/T2 of the thickness T1 to the thickness T2 is 1.0 or less. This enables the second specific protective layer 95 to serve as a water-penetration reduction portion that reduces the capillarity of water through the element body 60 in the longitudinal direction, similarly to the first specific protective layer 92. Consequently, the likelihood of moisture that moves backward inside the front end-side portion 84a of the protective layer 80 by capillarity passing through the second specific protective layer 95 and reaching the lower connector electrode 72 can be reduced. The above-described numerical ranges of the thicknesses T1 and T2 and the ratio T1/T2 of the first inner protective layer 83 can be applied to the thicknesses T1 and T2 and the ratio T1/T2 of the second inner protective layer 84. For example, in the second inner protective layer 84, the ratio T1/T2 is also preferably less than 1.0 and is more preferably 0.6 or less. The thickness T1 is preferably less than 5 μm. The thicknesses T1 and T2 of the first inner protective layer 83 and the thicknesses T1 and T2 of the second inner protective layer 84 may be equal to or different from each other, respectively.

The length Le (see FIGS. 4 and 5) of the first specific protective layer 92 and the second specific protective layer 95 in the front-to-rear direction is preferably 0.5 mm or more. When the length Le is 0.5 mm or more, the passage of the moisture through the first specific protective layer 92 and the second specific protective layer 95 can be reduced to a sufficient degree. The length Le may be 5 mm or more. The length Le may be 25 mm or less and may be 20 mm or less. Although the first specific protective layer 92 and the second specific protective layer 95 has the same length Le in this embodiment, they may have different lengths Le.

The protective layer 80 is composed of a ceramic, such as alumina, zirconia, spinel, cordierite, titania, and magnesia. In this embodiment, the protective layer 80 is composed of alumina. Although the first specific protective layer 92 and the front end-side portion 84a are composed of the same material (alumina) in this embodiment, they may be composed of different materials. The same applies to the second specific protective layer 95. A portion of the protective layer 80 which is other than the first specific protective layer 92 or the second specific protective layer 95 is a porous body having a porosity of 10% or more. In other words, the front end-side portion 83a, the rear end-side portion 83b, the front end-side portion 84a, the rear end-side portion 84b, and the outer protective layer 85 are porous bodies. The first specific protective layer 92 may be a porous body and may be a dense layer having a porosity of less than 10%. When the first specific protective layer 92 is dense, the passage of the moisture through the first specific protective layer 92 can be further reduced. Therefore, the first specific protective layer 92 is preferably dense. Similarly, the second specific protective layer 95 may be a porous body and is preferably dense.

The porosities of the parts of the inner protective layer 81 which are porous bodies may be 10% or more and 50% or less. The porosity of the outer protective layer 85 may be 10% or more and 85% or less. The outer protective layer 85 may have a higher porosity than the inner protective layer 81.

In the case where the first specific protective layer 92 and the second specific protective layer 95 are dense, the porosities of the above specific protective layers are preferably 8% or less and are more preferably 5% or less. The lower the porosities of the first specific protective layer 92 and the second specific protective layer 95, the larger the reduction in the capillarity of water through the element body 60 in the longitudinal direction which is achieved by the first specific protective layer 92 and the second specific protective layer 95.

The porosity of the first specific protective layer 92 is determined by the following method using an image (SEM image) obtained by inspecting the first specific protective layer 92 with a scanning electron microscope (SEM). First, the sensor element 20 is cut in the thickness direction of the first specific protective layer 92 such that a cross section of the first specific protective layer 92 can be inspected. The cross section is buried in a resin and ground in order to prepare an observation sample. An image of the observation section of the observation sample is taken with a SEM at a 1000 to 10000-fold magnification in order to obtain an SEM image of the first specific protective layer 92. Subsequently, the image is subjected to image analysis. A threshold value is determined on the basis of the brightness distribution of brightness data of pixels of the image by a discriminant analysis method (Otsu's binarization). On the basis of the threshold value, the pixels of the image are binarized into an object portion and a pore portion. The areas of the object portions and the pore portions are calculated. The ratio of the area of the pore portions to the total area (the total area of the object portions and the pore portions) is calculated as a porosity (unit: %). The porosities of the parts of the protective layer 80 which are other than the first specific protective layer 92 are also derived in the same manner as described above.

A method for producing the above-described gas sensor 10 is described below. First, a method for producing the sensor element 20 is described. In the production of the sensor element 20, first, a plurality of (in this embodiment, six) unbaked ceramic green sheets that correspond to the element body 60 are prepared. In each of the green sheets, as needed, notches, through-holes, grooves, and the like are formed by punching or the like, and electrodes and wire patterns are formed by screen printing. The wire patterns include an unbaked lead wire pattern that serves as an outer lead wire 75 after being baked. In addition, unbaked protective layers that are to be formed into the first inner protective layer 83 and the second inner protective layer 84 after baking are formed on the surfaces of the green sheets which correspond to the first and second surfaces 60a and 60b by screen printing. Subsequently, the green sheets are stacked on top of one another. The green sheets stacked on top of one another are an unbaked element body that is to be formed into the element body after baking and include unbaked protective layers. The unbaked element body is baked to form the element body 60 that includes the outer lead wire 75, the first inner protective layer 83, and the second inner protective layer 84. Subsequently, the outer protective layer 85 is formed by plasma spraying. Hereby, the sensor element 20 is prepared. For producing the protective layer 80, gel casting, dipping, and the like can be used in addition to screen printing and plasma spraying.

In the case where at least one of the materials or porosities of the front end-side portion 83a, the rear end-side portion 83b, and the first specific protective layer 92 included in the first inner protective layer 83 are set to be different from one another, the unbaked protective layers that correspond to these members are formed separately by screen printing. In the case where all of the front end-side portion 83a, the rear end-side portion 83b, and the first specific protective layer 92 are composed of the same material and have the same porosity but only the first specific protective layer 92 has a smaller thickness, the thickness may be adjusted by changing the number of times printing is performed, that is, for example, reducing the number of times screen printing is performed only in the region in which the unbaked protective layer that is to serve as the first specific protective layer 92 is to be formed. The thickness T1 can also be adjusted by changing the viscosity of the unbaked protective layer that corresponds to the first specific protective layer 92.

The gas sensor 10 that includes the sensor element 20 is produced. First, the sensor element 20 is inserted into the cylindrical body 41 so as to penetrate the cylindrical body 41 in the axial direction. Subsequently, the insulator 44a, the compact 45a, the insulator 44b, the compact 45b, the insulator 44c, and the metal ring 46 are disposed in the gap between the inner peripheral surface of the cylindrical body 41 and the sensor element 20 in this order. Then, the metal ring 46 is pressed in order to compress the compacts 45a and 45b. While the compacts 45a and 45b are compressed, the diameter reduction portions 43c and 43d are formed. Hereby, the element-sealing member 40 is produced, and the gap between the inner peripheral surface of the cylindrical body 41 and the sensor element 20 is sealed. The protective cover 30 is welded to the element-sealing member 40, and the bolt 47 is attached to the element-sealing member 40. Hereby, the assembly 15 is produced. Lead wires 55 attached to a rubber stopper 57 so as to penetrate the rubber stopper 57 and a connector 50 connected to the lead wires 55 are prepared. The connector 50 is connected to the rear end-side part of the sensor element 20. Subsequently, the external cylinder 48 is fixed to the main fitting 42 by welding. Hereby, the gas sensor 10 is produced.

An example of the application of the gas sensor 10 is described below. When the measurement-object gas flows inside the pipe 58 while the gas sensor 10 is attached to the pipe 58 as illustrated in FIG. 1, the measurement-object gas passes through the inside of the protective cover 30 and enters the element chamber 33. Consequently, the front end-side part of the sensor element 20 is exposed to the measurement-object gas. Upon the measurement-object gas passing through the protective layer 80, reaching the outer electrode 64, and reaching the inside of the sensor element 20 through the gas-to-be-analyzed introduction port 61, the detection unit 63 generates an electrical signal reflective of the NOx concentration in the measurement-object gas, as described above. The electrical signal is drawn through the upper and lower connector electrodes 71 and 72. The NOx concentration can be determined on the basis of the electrical signal.

The measurement-object gas may contain moisture, which may move inside the protective layer 80 by capillarity. If the moisture reaches the upper and lower connector electrodes 71 and 72, which are exposed to the outside, the water and the components dissolved in the water, such as sulfuric acid, may cause rusting and corrosion of the upper and lower connector electrodes 71 and 72 and a short circuit between some of the upper and lower connector electrodes 71 and 72 which are adjacent to one another. However, in this embodiment, even when the moisture contained in the measurement-object gas moves inside the protective layer 80 (in particular, inside the first inner protective layer 83 and the second inner protective layer 84) toward the rear end-side part of the element body 60 by capillarity, the moisture reaches the first specific protective layer 92 and the second specific protective layer 95 before reaching the upper and lower connector electrodes 71 and 72. Since the thickness T1 of the first inner protective layer 83 is 10 μm or less and the ratio T1/T2 of the first inner protective layer 83 is 1.0 or less, the first specific protective layer 92 reduces the likelihood of the moisture passing through the first specific protective layer 92 from the front end-side portion 83a and reaching the upper connector electrode 71 (the upper connector electrodes 71a to 71d). Therefore, in the sensor element 20, the above-described trouble caused by the water adhering to the upper connector electrode 71 can be reduced. Similarly, since the thickness T1 of the second inner protective layer 84 is 10 μm or less and the ratio T1/T2 of the second inner protective layer 84 is 1.0 or less, the second specific protective layer 95 reduces the likelihood of the moisture passing through the second specific protective layer 95 from the front end-side portion 84a and reaching the lower connector electrode 72 (the lower connector electrodes 72a to 72d). Therefore, in the sensor element 20, the above-described trouble caused by the water adhering to the lower connector electrode 72 can be reduced.

The correspondences between the elements constituting this embodiment and the elements constituting the present invention are explicitly described below: the element body 60 in this embodiment corresponds to the element body in the present invention; the upper connector electrodes 71a to 71d and the lower connector electrodes 72a to 72d each correspond to the connector electrode; the first surface 60a and the second surface 60b correspond to the side surface on which the connector electrodes are disposed; the protective layer 80 corresponds to the protective layer; the first specific protective layer 92 and the second specific protective layer 95 each correspond to the specific protective layer; the outer electrode 64 corresponds to the outer electrode; the detection unit 63 corresponds to the detection unit; and the outer lead wire 75 corresponds to the outer lead portion.

In the sensor element 20 according to this embodiment which is described in detail above, since the thickness T1 of the first specific protective layer 92 included in the first inner protective layer 83 is 10 µm or less and the ratio T1/T2 of the thickness T1 to the thickness T2 of the front-side portion 88 is 1.0 or less, the likelihood of the moisture reaching the upper connector electrode 71 through the protective layer 80 can be reduced. Similarly, since the thickness T1 of the second specific protective layer 95 included in the second inner protective layer 84 is 10 µm or less and the ratio T1/T2 is 1.0 or less, the likelihood of the moisture reaching the lower connector electrode 72 through the protective layer 80 can be reduced.

When the ratio T1/T2 of the first inner protective layer 83 is 0.6 or less, the passage of the moisture through the first specific protective layer 92 can be further reduced. Similarly, when the ratio T1/T2 of the second inner protective layer 84 is 0.6 or less, the passage of the moisture through the second specific protective layer 95 can be further reduced.

When the thickness T1 of the first specific protective layer 92 is less than 5 µm, the likelihood of the moisture reaching the upper connector electrode 71 through the protective layer 80 can be further reduced. Similarly, when the thickness T1 of the second specific protective layer 95 is less than 5 µm, the likelihood of the moisture reaching the lower connector electrode 72 through the protective layer 80 can be further reduced.

When the first specific protective layer 92 has a porosity of less than 10%, that is, the first specific protective layer 92 is dense, the passage of the moisture through the first specific protective layer 92 can be further reduced. Similarly, when the second specific protective layer 95 has a porosity of less than 10%, that is, the second specific protective layer 95 is dense, the passage of the moisture through the second specific protective layer 95 can be further reduced.

Since the protective layer 80 (in particular, the first inner protective layer 83) covers the outer lead wire 75, the outer lead wire 75 can be protected by the protective layer 80.

It is to be understand that the present invention is not limited to the above-described embodiment at all, but intended to include a variety of forms within the technical scope of the present invention.

For example, in the above-described embodiment, the first specific protective layer 92 and the second specific protective layer 95 are arranged to overlap the insulator 44b in the front-to-rear direction. However, the present invention is not limited to this. For example, at least one of the first specific protective layer 92 or the second specific protective layer 95 may be arranged to overlap the insulator 44a or 44c in the front-to-rear direction and may be disposed backward of the metal ring 46. Although the first specific protective layer 92 and the second specific protective layer 95 are arranged not to be exposed to the element chamber 33 in the above-described embodiment, at least one of the first specific protective layer 92 or the second specific protective layer 95 may be arranged to be exposed to the element chamber 33, that is, the measurement-object gas. For example, at least one of the first specific protective layer 92 or the second specific protective layer 95 may be disposed backward of the outer protective layer 85 so as to be exposed to the element chamber 33.

Although each of the first inner protective layer 83 and the second inner protective layer 84 satisfies the condition "the thickness T1 is 10 µm or less and the ratio T1/T2 is 1.0 or less" in the above-described embodiment, only one of the first inner protective layer 83 or the second inner protective layer 84 may satisfy the condition.

As for the condition "the thickness T1 is 10 µm or less and the ratio T1/T2 is 1.0 or less", in the case where the ratio T1/T2 is 1.0, the first specific protective layer 92 has the same thickness as the front end-side portion 83a (in particular, the front-side portion 88). In such a case, the first specific protective layer 92 and the front end-side portion 83a may be indistinguishable from each other. Even in such a case, when at least a part of the portion of the protective layer 80 which covers the first surface 60a has a thickness of 10 µm or less, it is considered that such a part is the first specific protective layer 92 and the condition "the thickness T1 is 10 µm or less and the ratio T1/T2 is 1.0 or less" is satisfied. For example, in the case where the entirety of the first inner protective layer 83 has the same thickness and the thickness of the first inner protective layer 83 is 10 µm or less or is less than 5 µm, it is considered that the condition "the thickness T1 is 10 µm or less and the ratio T1/T2 is 1.0 or less" is satisfied.

In the above-described embodiment, the protective layer 80 does not necessarily include the outer protective layer 85.

Figure 9:
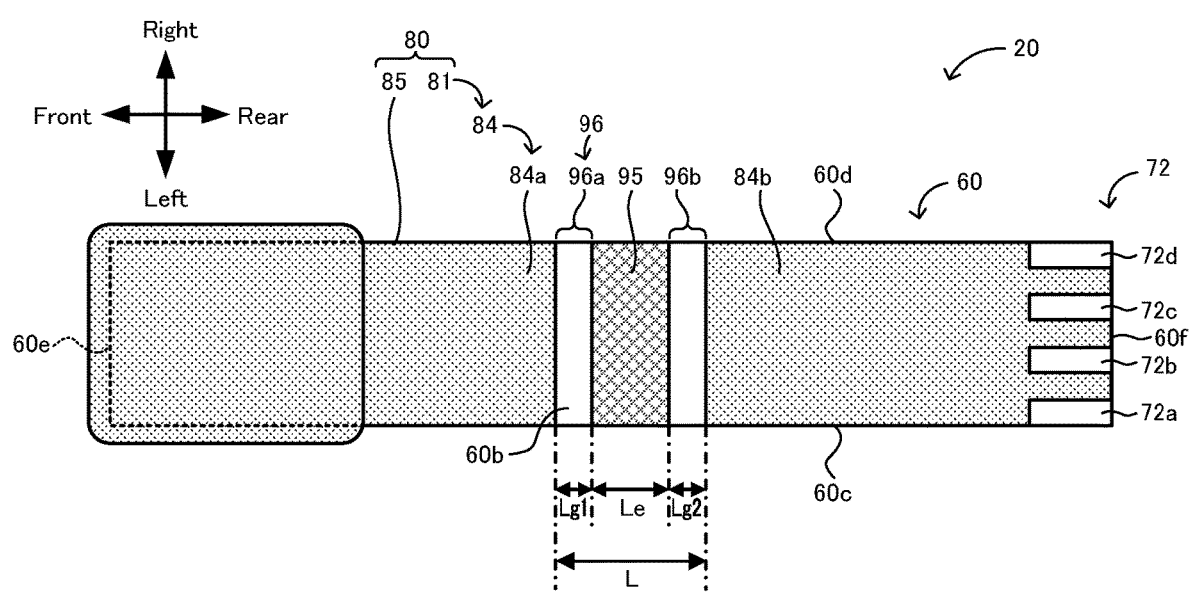
FIG. 9 is a bottom view of a modification example of the sensor element 20.

In the above-described embodiment, a part in which the second inner protective layer 84 is absent and the second surface 60b of the element body 60 is exposed may be present. FIG. 9 illustrates an example of the case where a gap region 96 is present forward and backward of the second specific protective layer 95 so as to be adjacent to the second specific protective layer 95. The gap region 96 illustrated in FIG. 9 includes a front-side gap region 96a disposed forward of the second specific protective layer 95 so as to be adjacent to the second specific protective layer 95 and a rear-side gap region 96b disposed backward of the second specific protective layer 95 so as to be adjacent to the second specific protective layer 95. In the part in which the gap region 96 is present, the second surface 60b is exposed. Since the gap region 96 is a space in which the second inner protective layer 84 is absent, the capillarity of water through the element body 60 in the longitudinal direction is unlikely to occur. Therefore, the gap region 96 also reduces the likelihood of the moisture moving through the element body 60 in the longitudinal direction and reaching the lower connector electrode 72. The gap region 96 may include only one of the front-side gap region 96a and the rear-side gap region 96b. The length Lg of the gap region 96 in the longitudinal direction is preferably 1 mm or less. In the case where the gap region 96 includes the front-side gap region 96a and the rear-side gap region 96b as illustrated in FIG. 9, the total of the length Lg1 of the front-side gap region 96a in the longitudinal direction and the length Lg2 of the rear-side gap region 96b in the longitudinal direction is considered as the length Lg. Note that a gap region may also be present on the first surface 60a-side of the element body 60.

Although the first inner protective layer 83 includes the rear end-side portion 83b disposed backward of the first specific protective layer 92 in the above-described embodiment, the rear end-side portion 83b may be omitted. Similarly, the second inner protective layer 84 does not necessarily include the rear end-side portion 84b. Note that, as for the first inner protective layer 83, when the rear end-side portion 83b is absent, a part of the outer lead wire 75 is exposed. Therefore, the first inner protective layer 83 preferably includes the rear end-side portion 83b.

In the above-described embodiment, the sensor element 20 does not necessarily include the second inner protective layer 84 and the second surface 60b is not necessarily covered with the protective layer 80. All that is required is that, among the side surfaces of the element body (in the above-described embodiment, the first to fourth surfaces 60a to 60d), at least one of the side surfaces on which the connector electrode is disposed (in the above-described embodiment, the first and second surfaces 60a and 60b) be provided with the protective layer including the specific protective layer. This reduces the likelihood of the moisture reaching the connector electrode at least on the side surface on which the protective layer including the specific protective layer is disposed.

Although the first inner protective layer 83 covers the region extending from the front end to the rear end of the first surface 60a except the region in which the upper connector electrode 71 is present in the above-described embodiment, the present invention is not limited to this. For example, the first inner protective layer 83 may cover the region that extends from the front end of the first surface 60a to the front end of the upper connector electrodes 71a to 71d. The same applies to the second inner protective layer 84.

Although the element main body 60 has a rectangular cuboid shape in the above-described embodiment, the present invention is not limited to this. For example, the element main body 60 may have a hollow cylindrical shape or a solid cylindrical shape. In such a case, the element main body 60 has one side surface.

Although the gas sensor 10 detects NOx concentration as a specific gas concentration in the above-described embodiment, the present invention is not limited to this. The concentration of another oxide may be detected as a specific gas concentration. In the case where the specific gas is an oxide, oxygen is generated when the specific gas is reduced in the vicinity of the measurement electrode 67 as in the above-described embodiment, and the specific gas concentration can be detected on the basis of the value detected by the detection unit 63 which corresponds to the oxygen. The specific gas may be a non-oxide, such as ammonia. In the case where the specific gas is a non-oxide, the specific gas is converted to an oxide in the vicinity of, for example, the inner main pump electrode 65 (e.g., ammonia is oxidized to NO) and oxygen is generated when the oxide is reduced in the vicinity of the measurement electrode 67. Thus, in such a case, the specific gas concentration can be detected on the basis of the value detected by the detection unit 63 which corresponds to the oxygen. As described above, regardless of whether the specific gas is an oxide or a non-oxide, the gas sensor 10 is capable of detecting the specific gas concentration on the basis of the oxygen that is derived from the specific gas and generated in the vicinity of the measurement electrode 67.

EXAMPLES

Example cases where a specific sensor element was prepared are described below as Examples. Test Examples 1 to 8 and 11 to 18 correspond to Examples of the present invention, while Test Examples 9, 10, 19, and 20 correspond to Comparative Examples. Note that the present invention is not limited by Examples below.

Test Example 1

In Test Example 1, a sensor element that was the same as the sensor element 20 illustrated in FIGS. 2 to 4 and 6, except that a gap region 96 (a front-side gap region 96a and a rear-side gap region 96b) was present on the second surface 60b-side of the element body 60 as illustrated in FIG. 9 and the outer protective layer 85 was omitted, was prepared. The sensor element 20 of Test Example 1 was prepared in the following manner. First, zirconia particles containing 4 mol % yttria serving as a stabilizer were mixed with an organic binder and an organic solvent. The resulting mixture was formed into six ceramic green sheets by tape casting. Patterns of electrodes, an outer lead wire 75, and the like were printed in each of the green sheets. In addition, unbaked protective layers that were to be formed into the first inner protective layer 83 and the second inner protective layer 84 after baking were formed by screen printing. The unbaked protective layers were composed of a slurry prepared by mixing a raw-material powder (an alumina powder), a binder solution (polyvinyl acetal and butyl carbitol), a solvent (acetone), and a pore-forming material with one another. The entirety of the unbaked protective layer that was to be formed into the first inner protective layer 83 was formed using the same slurry, including the portion that was to be formed into the first specific protective layer 92 after baking, such that the entirety of the first inner protective layer 83 was composed of the same material and had the same porosity. The number of times printing was performed was changed between the portion of the unbaked protective layer which was to be formed into the first specific protective layer 92 after baking and the other portion in order to make the first specific protective layer 92 thinner than any of the front end-side portion 83a and the rear end-side portion 83b. Subsequently, the six green sheets were stacked on top of one another and baked in order to prepare a sensor element 20 including the outer lead wire 75, the first inner protective layer 83, and the second inner protective layer 84, which was used as a sensor element 20 of Test Example 1. The dimensions of the element body 60 were 67.5 mm long, 4.25 mm wide, and 1.45 mm thick. The length Le of the first specific protective layer 92 in the front-to-rear direction was 5 mm. The thicknesses T1 and T2 of the first inner protective layer 83 included in the sensor element 20 of Test Example 1 were measured by the above-described method. The thickness T1 was 4.5 μm, the thickness T2 was 18.0 μm, and the ratio T1/T2 was 0.25. The porosity of the first inner protective layer 83 (the front end-side portion 83a and the first specific protective layer 92) was measured by the above-described method. The porosity was 30%.

Test Examples 2 to 10

In Test Examples 2 to 10, a sensor element 20 was prepared as in Test Example 1, except that the thicknesses T1 and T2 and the ratio T1/T2 were changed as described in Table 1. In Test Examples 2 to 10, the thicknesses T1 and T2 were adjusted by changing the amount of the solvent added to the slurry used for forming the unbaked protective layer that was to be formed into the front end-side portion 83a and the first specific protective layer 92 after baking from the amount of Test Example 1 in order to adjust the viscosity of the slurry and changing the number of times printing was performed in the formation of the unbaked protective layer. In all of Test Examples 2 to 10, the front end-side portion 83a and the first specific protective layer 92 were composed of the same material and had the same porosity (30%). In Test Examples 2 to 10, the thicknesses T1 and T2 and the ratio T1/T2 were measured as in Test Example 1.

Test Examples 11 to 20

In Test Example 11, a sensor element 20 was prepared as in Test Example 1, except that the porosity of the first specific protective layer 92 was adjusted to 0%. In the preparation of the sensor element 20 of Test Example 11, the slurry used for forming the unbaked protective layer that was to serve as a first specific protective layer 92 after being baked was the same as the slurry used for forming the unbaked protective layer that was to serve as a front end-side portion 83*a*, except that the pore-forming material was not added and viscosity was adjusted by changing the amount of the solvent added. The thicknesses T1 and T2 and the ratio T1/T2 of the sensor element 20 of Test Example 11 were adjusted to be equal to those of Test Example 1 by changing the viscosities of the slurries used for forming the unbaked protective layers and the number of times printing was performed. Similarly, in Test Examples 12 to 20, sensor elements 20 that were the same as those prepared in Test Examples 2 to 10, respectively, were prepared except that the porosity of the first specific protective layer 92 was adjusted to 0%.

In all of Test Examples 1 to 20, the first specific protective layer 92 was arranged such that the front end thereof was located at a position 30 mm from the front end of the element body 60. In other words, since the length Le of the first specific protective layer 92 was 5 mm, the first specific protective layer 92 was present in the region 30 to 35 mm away from the front end of the element body 60.

[Liquid Penetration Test]

The sensor elements 20 prepared in Test Examples 1 to 20 were subjected to a liquid penetration test, in which the amount of liquid that penetrated the rear end-side part of the element body 60 by capillarity when the front end-side part of the element body 60 was immersed in the liquid was determined. First, while the sensor element 20 was held such that the longitudinal direction of the sensor element 20 was parallel to the vertical direction, a part of the sensor element 20 which extended from the front end (fifth surface 60*e*) of the element body 60 to a position (hereinafter, "immersion position") 25 mm from the front end toward the rear end was immersed into a red-check solution. While the sensor element was immersed in the red-check solution, the sensor element was left to stand for 24 hours. Subsequently, the arrival position that indicates the degree at which the red-check solution penetrated from the immersion position toward the rear end was measured visually. The arrival position was measured as a distance from the front end of the element body 60. In the case where the arrival position measured after 24 hours was 35 mm or less, that is, in the case where the red-check solution did not pass through the first specific protective layer 92, an evaluation grade of "Excellent (A)" was given. In the case where the arrival position was more than 35 mm and 40 mm or less, an evaluation grade of "Good (B)" was given. In the case where the arrival position was more than 40 mm and 45 mm or less, an evaluation grade of "Poor (C)" was given. In the case where the arrival position was more than 45 mm, an evaluation grade of "Bad (D)" was given. The red-check solution used was a stamp ink produced by Shachihata Inc. (for sol stamp stand) (Model No.: S-1, Color: Red). The red-check solution included water: 50 to 60 wt %, glycerin: 30 to 40 wt %, and dye: 5 to 15 wt %. The components and composition of the red-check solution are described in a safety data sheet (SDS) produced by Shachihata Inc.

Tables 1 and 2 summarize the thicknesses T1 and T2 and the ratio T1/T2 of each of Test Examples 1 to 20 and the evaluation results of the liquid penetration test conducted in each of Test Examples 1 to 20.

TABLE 1

|  | Thickness T1 [μm] | Thickness T2 [μm] | Ratio T1/T2 | Evaluation of Liquid Penetration Test |
|---|---|---|---|---|
| Test Example 1 | 4.5 | 18.0 | 0.25 | A |
| Test Example 2 | 4.5 | 4.5 | 1.0 | A |
| Test Example 3 | 7.0 | 18.0 | 0.4 | A |
| Test Example 4 | 7.0 | 12.0 | 0.6 | A |
| Test Example 5 | 7.0 | 7.0 | 1.0 | B |
| Test Example 6 | 10.0 | 18.0 | 0.6 | A |
| Test Example 7 | 10.0 | 12.0 | 0.8 | B |
| Test Example 8 | 10.0 | 10.0 | 1.0 | B |
| Test Example 9 | 12.0 | 18.0 | 0.7 | D |
| Test Example 10 | 12.0 | 12.0 | 1.0 | D |

TABLE 2

|  | Thickness T1 [μm] | Thickness T2 [μm] | Ratio T1/T2 | Evaluation of Liquid Penetration Test |
|---|---|---|---|---|
| Test Example 11 | 4.5 | 18.0 | 0.25 | A |
| Test Example 12 | 4.5 | 4.5 | 1.0 | A |
| Test Example 13 | 7.0 | 18.0 | 0.4 | A |
| Test Example 14 | 7.0 | 12.0 | 0.6 | A |
| Test Example 15 | 7.0 | 7.0 | 1.0 | B |
| Test Example 16 | 10.0 | 18.0 | 0.6 | A |
| Test Example 17 | 10.0 | 12.0 | 0.8 | A |
| Test Example 18 | 10.0 | 10.0 | 1.0 | B |
| Test Example 19 | 12.0 | 18.0 | 0.7 | C |
| Test Example 20 | 12.0 | 12.0 | 1.0 | C |

The results described in Tables 1 and 2 show that, in all of Test Examples 1 to 8 and 11 to 18 where the thickness T1 was 10 μm or less and the ratio T1/T2 was 1.0 or less, an evaluation grade of "Excellent (A)" or "Good (B)" was given as the result of the liquid penetration test. In contrast, in all of Test Examples 9, 10, 19, and 20 where the thickness T1 was more than 10 μm, an evaluation grade of "Poor (C)" or "Bad (D)" was given as the result of the liquid penetration test. The above results confirmed that the likelihood of the moisture moving backward inside the first inner protective layer 83 can be reduced when the thickness T1 is 10 μm or less and the ratio T1/T2 is 1.0 or less.

A comparison between the results of Test Examples 1 and 2, a comparison between the results of Test Examples 3 to 5, and a comparison between the results of Test Examples 6 to 8, where the thicknesses T1 described in Table 1 were the same as each other, confirmed that, the lower the ratio T1/T2, the higher the evaluation grade given in the liquid penetration test. In particular, in all of Test Examples 1, 3, 4, and 6 where the ratio T1/T2 was 0.6 or less, the evaluation grade given was "Excellent (A)" regardless of the thickness T1. On the basis of the above results, it is considered that the ratio T1/T2 is preferably 0.6 or less. The same characteristic was also confirmed in Table 2.

A comparison between the results of Test Examples 2, 5, 8, and 10 where the ratios T1/T2 described in Table 1 are equal to one another confirmed that, the smaller the thickness T1, the higher the evaluation grade given in the liquid penetration test. In particular, in Test Example 2 where the thickness T1 was less than 5 μm, the evaluation grade given was "Excellent (A)" although the ratio T1/T2 was 1.0. On the basis of the above results, it is considered that the thickness T1 is preferably less than 5 μm. Furthermore, it is considered that, in the case where the thickness T1 is less than 5 μm, the likelihood of the moisture passing through the first specific protective layer 92 and reaching the upper connector electrode 71 can be reduced to a sufficient degree even when the ratio T1/T2 is 1.0, that is, the first specific protective layer 92 has the same thickness as the front-side portion 88.

A comparison between the results of Test Examples 7 and 17, a comparison between the results of Test Examples 9 and 19, and a comparison between the results of Test Examples 10 and 20, where the thicknesses T1, the thicknesses T2, and the ratios T1/T2 described in Tables 1 and 2 were the same as each other, confirmed that the evaluation grade given in the liquid penetration test conducted in Test Examples 17, 19, and 20 described in Table 2, where the first specific protective layer 92 had a porosity of less than 10%, that is, was dense, were higher than in Test Examples 7, 9, and 10 described in Table 1, respectively. As for the other test examples, a comparison between the results of test examples where the thicknesses T1, the thicknesses T2, and the ratios T1/T2 described in Tables 1 and 2 were the same as each other confirmed that the arrival position [mm] measured in the liquid penetration test conducted in the test example described in Table 2 was smaller. The above results confirmed that, in the case where the first specific protective layer 92 is dense, the passage of the moisture through the first specific protective layer 92 can be further reduced.

What is claimed is:

1. A sensor element for detection of a specific gas concentration in a measurement-object gas,
the sensor element comprising:
a long-length element body including front and rear ends and one or more side surfaces, the front and rear ends being ends of the element body in a longitudinal direction of the element body, the one or more side surfaces being surfaces extending in the longitudinal direction;
one or more connector electrodes disposed on a rear end-side part of a side surface of the one or more side surfaces, the one or more connector electrodes being in electrical conduction with an outside; and
a protective layer that covers at least a front end-side part of the side surface on which the one or more connector electrodes are disposed,
wherein the protective layer includes a specific protective layer having a thickness T1 of 10 μm or less, and
wherein a ratio T1/T2 of the thickness T1 to a thickness T2 of a front-side portion of the protective layer, the front-side portion facing a front end of the specific protective layer, is 0.6 or less; and
wherein the thickness T1 is less than 5 μm.

2. The sensor element according to claim 1,
wherein the specific protective layer has a porosity of less than 10%.

3. The sensor element according to claim 1,
the sensor element comprising:
a detection unit including a plurality of electrodes disposed in the front end-side part of the element body, the detection unit detecting the specific gas concentration in the measurement-object gas; and
an outer lead portion disposed on the side surface on which the one or more connector electrodes are disposed, the outer lead portion providing electrical conduction between any of the plurality of electrodes and one of the one or more connector electrodes,
wherein the protective layer covers the outer lead portion.

4. The sensor element according to claim 3,
wherein the specific protective layer has a porosity of less than 10%.

5. A gas sensor comprising the sensor element according to claim 1.

* * * * *